Aug. 17, 1948. E. J. HUTCHINSON 2,447,182
DOUGHNUT MAKER
Filed May 22, 1945
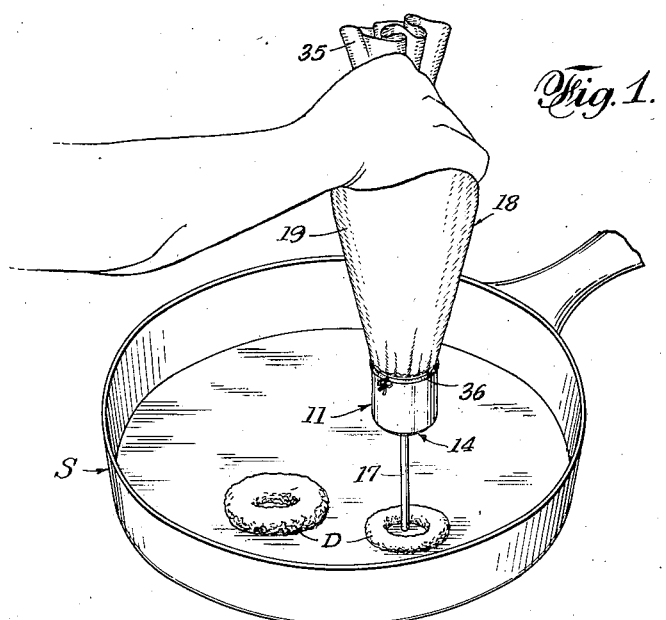
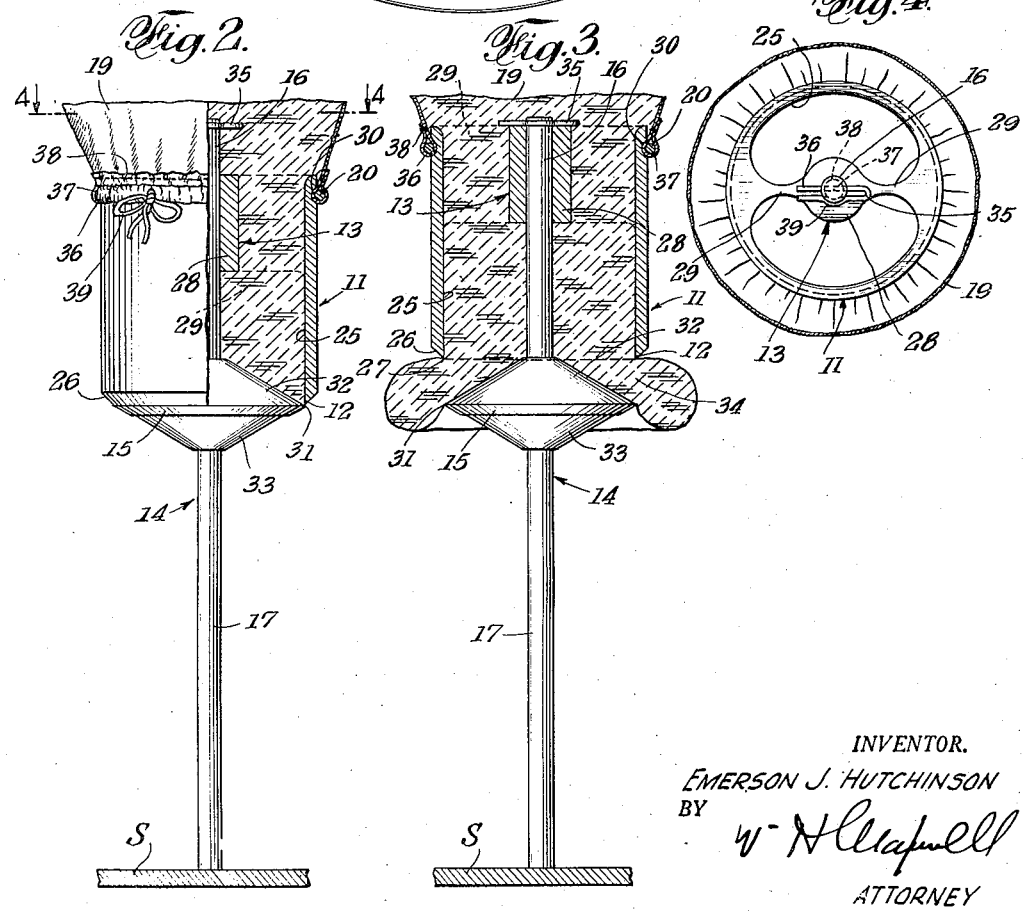
INVENTOR.
EMERSON J. HUTCHINSON
BY
ATTORNEY Patented Aug. 17, 1948

2,447,182

UNITED STATES PATENT OFFICE 2,447,182

DOUGHNUT MAKER

Emerson J. Hutchinson, Los Angeles, Calif.

Application May 22, 1945, Serial No. 595,162

3 Claims. (Cl. 107—14)

This invention relates to doughnut makers and an object of my invention is to provide an extremely simple, inexpensive, easily operable and practical device for making doughnuts, or the like.

Another object of my invention is to provide a doughnut forming device of such extreme simplcity that it can easily be used by persons having little or no mechanical skill and particularly adapted for home use.

Another object of my invention is to provide a doughnut maker comprising only three simple, essential and easily cleanable parts capable of rapid assembly and disassembly without the aid of tools or other mechanical aids.

Another object of my invention is to provide a doughnut maker which is light in weight so that it can be easily operated with one hand to produce uniform desirably shaped doughnuts.

A further object of my invention is to provide a doughnut making device which can be held in the hand of the user and with which doughnuts are formed by a simple vertical reciprocating movement of the doughnut device with respect to a suitable abutment such as the bottom of a pan, skillet or other vessel in which the device deposits the doughnuts being formed or made.

The invention is characterized by its extreme simplicity as to construction, operations, and also maintenance since it is a primary object of the invention to provide a doughnut maker particularly suitable for home use.

The various objects and features of my invention will be fully understood from the following detailed description of a typical preferred form and application of the invention, throughout which description reference is made to the accompanying drawings, in which:

Fig. 1 is a perspective view of a doughnut maker embodying my invention and shown in use in a typical manner;

Fig. 2 is a vertical half sectional, half elevational view, partly broken, of the doughnut maker shown in Fig. 1;

Fig. 3 is a vertical partly broken sectional view of the doughnut maker in another operative position; and Fig. 4 is a plan sectional view as taken on the line 4—4 of Fig. 1.

I have illustrated and will hereinafter describe one typical form of my invention, it being understood that variations may be made from the particular details shown without departing from the principles of the invention.

The doughnut maker which is shown in the drawing comprises, generally, only three essential parts: a main part in the form of a tubular body 11 having a valve seat 12 at one end and a central guide 13; a valve unit 14 comprising a valve disc 15 cooperating with the valve seat 12, an upper stem 16 operating in the guide 13, and a lower depending stem 17 which forms a fixed stop and is adapted to engage and abut against the bottom of a skillet or the like S; and a flexible dough container 18 comprising a fabric bag or sack 19 provided with the draw-string 20, or the like, around the lower open end of the container for connecting said container to the body 11 so that material, such as dough, from the container 18 can be delivered to the body 11 for discharge past the valve.

The main part or body 11 is formed as a rigid, light weight unit of a light metal such as aluminum, or of a suitable molded plastic material such as a phenolic resin. The tubular body 11 is open-ended, affording a through cylindrical chamber 25. The valve seat 12 is formed by providing an annular chamfer 26 at the lower end of the tubular body 11. By this construction a sharp annular edge 27 is formed, which edge is adapted to cut dough cleanly and with little effort.

The central guide 13 comprises a tubular part 28 which extends longitudinally from a point substantially opposite the upper end of the tubular body 11 downward, toward the valve seat 12. The tubular part 28 is integrally connected with the tubular body 11 by suitable arms or ribs 29 extending in or through the chamber 25. The ribs 29 form a supporting spider for the tubular body part 28. Adjacent its upper end the tubular body 11 is provided in its outer wall or surface with an outer annular groove 30.

The valve unit 14 may be a solid or integral unit. However, I prefer to construct this unit of a rod which comprises the upper and lower stems 16 and 17, respectively, and the valve disc 15 suitably and permanently secured to said rod. By this structure I can make the rod of steel or a like strong material and the valve disc of a material similar to the cylindrical unit 12.

The valve disc, generally, is disposed beneath the valve seat 12 and is somewhat larger in diameter than the annular edge 27 so that the peripheral edge 31 of the valve will engage said annular edge 27 to cut or shear dough passing from the chamber 25. The valve disc 15 is shown with an upper conical part 32 which serves as means for guiding dough outwardly to the valve seat 12 and with an inverted conical lower part 33 which lends rigidity to said valve disc 15. The upper stem 16 extends axially upward in the chamber 25, through the central guide 13 and when the valve disc 15 is engaged with the seat 12 the stem 16 projects upwardly above the top end of the cylindrical unit 10. This projection of the stem 16 is commensurate in extent to the desired maximum space between the valve disc 15 and seat 12 when said valve disc and seat are apart to provide an annular discharge throat 34 for dough passing from the chamber 25. The length of the lower stem 17 may vary. However, it is preferably long enough so that when the bottom end of said stem is set on the bottom of a vessel such as the skillet S, the valve disc 15 is elevated with respect to the level of the fat in which the doughnuts are cooked.

From the foregoing description it may be seen that the valve unit 14 and the body 11 are movable, reciprocally relative to each other. The movement is limited in one direction by the engagement of the valve disc 15 and its seat 12. I provide means for limiting said movement in the other direction and for this purpose have shown a cotter pin 35 having one leg 36 extending through a transverse hole 37 adjacent the upper end of the upper stem 16, and an annular groove 38 in said stem for engagement with an outwardly curved hump 39 formed in the other leg of said cotter pin. Said cotter pin engages the upper end of the central guide 13 when the valve is moved to its maximum distance from the seat 12. The cotter pin is easily inserted or removed for quick assembly or disassembly of the parts. In practice I may vary the construction and instead of the cotter pin I may employ other means such as a resilient snap ring around the stem which can be easily forced through the central guide but which will amply serve as a movement limiting abutment as above described.

The bag 19 of the flexible container 18 comprises a substantially impervious preferably conically formed fabric member which is open at both its larger upper end 35 and at its smaller lower end 36. Said open lower end 36 is provided with an annular pocket or channel 37 by doubling back the end of the fabric cone and stitching along the line 38. The drawstring 20 in the channel 37 serves to draw said bag end 36 into the groove 30 of the tubular body 11 to securely attach the container 18 to said body, said drawstring being tied at 39.

The doughnut maker above provided is easily prepared for use. The upper stem 16 is inserted through the central guide 13, the cotter pin 35 is applied, and the flexible container fastened to the body 11. With the lower stem 17 resting on any support, the container 18 is filled with a batch of dough. The filled part of the bag provides a hand hold comprising the upper larger end of said container. By gathering said upper end together and pressing lightly on the dough filled portion thereof, the dough may be forced into the chamber 25 and against the conical part 32 of the valve disc as shown in Fig. 2. The dough maker is then ready for operation.

The dough maker is transferred to the vessel in which the doughnuts are to be cooked and the stem 17 set upright on the bottom of said vessel. By pressing on the filled portion of the container 18 with the palm of the hand which holds the device, the dough in the chamber 25 is forced out between the valve disc edge 31 and the tubular body edge 27. This pressure causes an upward movement of the unit 10 and the container 18 and results in the throat 34 becoming progressively wider. As the dough is pressed through the throat 34, it increases in diameter and sags down around the disc edge 31 as shown in Fig. 3. When the top end of the central guide 13 encounters the cotter pin 35, the limit of movement upward is attained. By continuing a light but firm pressure on the container 18 and by pressing downwardly on said container, the valve seat 12 will be moved back toward the valve disc edge 31. During this downward movement the sharp annular edge 27 cuts into the dough to part it cleanly and when said edge 27 encounters the valve disc, a torus-shaped piece of dough D (shown in Fig. 1) will fall into the skillet S or other vessel, or rather, upon the surface of the cooking oil in said vessel. By lifting the entire device and setting the stem 17 upon another portion of the skillet, the operation can be repeated.

It is to be noted that the device which I have provided is extremely simple in construction and also in operation. It involves but few simple parts that can be easily and cheaply made, which are simple to assemble and operate and which can be easily kept clean.

Having described only a typical preferred form and application of my invention I do not wish to be limited or restricted to the specific details herein set forth, but wish to reserve to myself any modifications or variations that may appear to those skilled in the art and fall within the scope of the following claims.

Having described my invention, I claim:

1. A device of the character described comprising a cylindrically tubular body, an open ended tubular guide axially disposed in the upper portion of said body, ribs connecting the body and the guide, a valve axially movable to engage the lower end of said body to close the same, said valve comprising a disc and an axial stem extending upwardly from the disc through the body and the tubular guide and extending downwardly from the disc forming a fixed stop, means on the stem retaining the stem in the tubular guide, and a flexible container detachably mounted on the said body at the upper end thereof.

2. A device of the character described comprising a cylindrically tubular body, a tubular guide axially disposed in the upper portion of said body, ribs connecting the body and the guide, said body having an annular valve seat at its lower end, a valve axially movable to engage said valve seat, said valve comprising a disc, an axial stem extending upwardly from the disc through said body and completely through the tubular guide and a stop depending from the disc and a retainer on the stem above the tubular guide stopping withdrawal of the stem from the guide.

3. A device of the character described comprising a cylindrically tubular body, an open ended tubular guide axially disposed in the upper portion of the body, ribs connecting the body and the guide, a valve axially movable to engage the lower end of said body to close the same, an axial stem extending outwardly from the valve through said body and tubular guide, a stop depending from the valve, a retainer on the stem above the upper end of the tubular guide, a flexible container engageable over the upper end portion of said body, and means releasably securing the container on the body.

EMERSON J. HUTCHINSON.

REFERENCES CITED

The following references are of record in the file of this patent:

UNITED STATES PATENTS

| Number | Name | Date |
| --- | --- | --- |
| 573,432 | Megson | Dec. 15, 1896 |
| 1,393,978 | Saunders | Oct. 18, 1921 |
| 1,416,735 | Morris | May 23, 1922 |
| 1,657,299 | Dagley | Jan. 24, 1928 |
| 1,829,120 | Toews | Oct. 27, 1931 |
| 2,184,825 | Wackler | Dec. 26, 1939 |
| 2,189,217 | McDonald | Feb. 6, 1940 |
| 2,197,270 | Helland | Apr. 16, 1940 |
| 2,214,218 | Aiken | Sept. 10, 1940 |
| 2,256,617 | Kipnis | Sept. 23, 1941 |
| 2,379,956 | Ersepke | July 10, 1945 |